Feb. 15, 1966    R. J. KEICHER    3,235,815
FREQUENCY SYNTHESIZER DIGIT SELECTOR
Filed Dec. 14, 1962    3 Sheets-Sheet 1

| .1mc/s SPECTRUM AVAILABLE AT INPUT TO EACH SIGNAL-TRANS-LATING CHANNEL | FREQUENCY(mc/s) AVAILABLE AT OUTPUT OF | | | | |
|---|---|---|---|---|---|
| | MIXER 23a | BPF 24a | ADJUST. OSC. 25a | MIXER 26a | BPF 27a |
| .100 | 1.375 | 1.375 | 11.225 | 12.600 | 12.600 |
| .200 | | | 11.325 | 12.700 | 12.700 |
| ⋮ | | | 11.425 | 12.800 | 12.800 |
| ⋮ | | | 11.525 | 12.900 | 12.900 |
| 1.100 | | | 11.625 | 13.000 | 13.000 |
| 1.200 | | | 11.725 | 13.100 | 13.100 |
| 1.300 | | | 11.825 | 13.200 | 13.200 |
| 1.400 | | | 11.925 | 13.300 | 13.300 |
| ⋮ | | | 12.025 | 13.400 | 13.400 |
| ⋮ | | | 12.125 | 13.500 | 13.500 |
| 9.800 | | | | | |
| 9.900 | | | | | |
| ⋮ | | | | | |
| 10.700 | | | | | |
| 10.800 | | | | | |
| ⋮ | | | | | |
| 12.600 | | | | | |
| 12.700 | | | | | |
| ⋮ | | | | | |
| 13.400 | | | | | |
| 13.500 | | | | | |

FIG. 4

United States Patent Office 3,235,815
Patented Feb. 15, 1966

3,235,815
FREQUENCY SYNTHESIZER DIGIT SELECTOR
Rudolph J. Keicher, Huntington Station, N.Y., assignor to Hazeltine Research, Inc., a corporation of Illinois
Filed Dec. 14, 1962, Ser. No. 244,691
8 Claims. (Cl. 331—39)

The invention relates to a frequency synthesis technique applicable to positional number systems of any base and capable of generating accurate, stable, discrete frequencies of arbitrary spacing. Specifically, this invention relates to apparatus for deriving a resultant frequency from a standard reference frequency source. The digits in each numerical order position of the resultant frequency are individually selected with an accuracy dependent only on the accuracy of the standard reference frequency source.

Any frequency generating means employed to derive an arbitrarily selected frequency within a given range of frequencies from a single standard reference frequency source while retaining the characteristics of that source may be termed a frequency synthesizer. The pertinent characteristics of a standard reference frequency source are its accuracy, frequency stability, and spectral purity.

Standard reference frequency sources employ some stable time-invariant resonance phenomena to determine the given reference frequency. Piezoelectric resonance and atomic and nuclear resonance phenomena are most commonly used. Piezoelectric quartz crystal frequency standards are commercially available with long-term stabilities better than one part in $10^9$ per day. Thus, with such a crystal standard, it becomes possible to maintain the stability of a standard reference frequency at, for example 100 mc./s. (megacycles per second) to within ±0.1 c.p.s. (cycles per second) per day. Atomic and nuclear frequency standards exhibit even greater frequency stabilities.

The spectral purity of a frequency standard denotes the degree to which spurious responses are absent from the spectrum of the standard reference frequency. An ideal frequency synthesizer does not contribute any additional spurious responses over and above those of the standard reference frequency source to the generated output frequency spectrum. In practice, however, this may only be approached as a limit.

It is, therefore, an object of the present invention to provide a frequency synthesizer that exploits the full capabilities of present and future standard reference frequency sources. This object will become apparent upon careful study of the development below.

The present age has exhausted the lower portion of the available frequency spectrum with a variety of communication and navigation facilities. Maximum utilization of this portion or of any part of the spectrum dictates continuous use of each and every segment of the available spectrum. This places a premium on frequency accuracy and stability and advanced modulation methods which permit operation on every available channel. Furthermore, close channel spacing can only be accomplished by communication and navigation apparatus which produces extremely low spurious output. Thus, the reduction of channel spacing requires more stringent specifications for the frequency generating means than as heretofore necessary.

It is, therefore, an object of the present invention to provide a new frequency generating means which offers a small frequency increment synthesis technique.

It is another object of this invention to provide a frequency synthesizer capable of simple, rapid, and accurate frequency selection with direct digital selection and display of the derived frequency in order to facilitate operation by nontechnical personnel.

It is still another object of this invention to provide a frequency generating means which achieves both close channel spacing and extremely low spurious output by use of simple fixed tuned filters only, novel repetitive circuitry, and optimum choice of mixing frequency ratios for all frequency modulators in the system.

Presently known frequency synthesis techniques are summarized by H. J. Finden in his article, "The Problem of Frequency Synthesis," appearing at pages 95–103, inclusive, of the Journal of the British Institution of Radio Engineers, January 1961, vol. 21, No. 1. In one method, termed the "true synthesis process," harmonics of multiples and submultiples of a standard reference frequency source are selected and combined to produce arbitrarily chosen discrete output frequencies. While the resultant frequency range can be made as wide as desired, the resultant frequency spacing is restricted by practical engineering limitations. In particular, a 10 kc./s. (kilocycle per second) spectrum is required to obtain a 10 kc./s. spacing between adjacent resultant output frequencies. A 1 kc./s. output frequency increment would require a 1 kc./s. spectrum. In general, the smallest synthesized frequency increment is equal to the interval of the lowest subharmonic spectrum employed. Heretofore it has been virtually impossible to generate high frequencies selectable in very small increments of, for example, 100 c.p.s., 10 c.p.s., or 1 c.p.s. without incorporating some less stable continuously tunable interpolation oscillator to fill in the gaps left by the frequency synthesizer.

It is, therefore, an object of the present invention to provide a new and improved frequency synthesizer which overcomes the aforementioned difficulty.

It is another object of this invention to provide a frequency generating means which utilizes any harmonic spectrum to generate frequency increments arbitrarily smaller than the interval of the harmonic spectrum employed.

It is a further object of the present invention to employ repetitive circuitry: in the interest of economical construction and maintenance; in the interest of non-obsolescence by achieving closer resultant output frequency spacing at a future date simply by the addition of one repetitive module for each lower order digit, and in the interest of affording a degree of redundancy by suffering only the loss of the lowest order digit upon the failure of any repetitive module.

It is another object of the present invention to provide a frequency synthesizer that has an extremely simple switching requirement for digital selection, thereby assuring a minimum of induced interference and low spurious output.

It is finally an object of this invention to provide a criterion for choosing the component frequencies of the frequency synthesizer in positional number systems of different bases such that simple and inexpensive fixed tuned bandpass filters can be used throughout, while still maintaining optimum mixing frequency ratios for lowest possible spurious content.

In accordance with the present invention, in a frequency synthesizer, apparatus for generating a resultant frequency of precise value expressed in a number system of base N with digital values accurately selected to any desired low order position, which comprises means for supplying a set of individual frequencies having accurately controlled values in the range $f_1$ to $[f_1+(N-1).\delta]$, where $\delta$ is the frequency spacing between adjacent ones of the individual frequencies, and where $$f_1 = \delta(N-1)[\rho+(N-1)],$$

with $\rho$ being any positive constant greater than zero, and means for supplying a second frequency of accurately controlled value within the range $f_2$ to $[f_2+\delta]$, where $$f_2 = \frac{f_1}{N-1}$$

The apparatus also comprises means including a plurality of signal-translating channels for selecting in each channel a digit to appear in the resultant frequency, each channel comprising means for producing from a given frequency and one of the individual frequencies, combination frequencies thereof lying within discrete frequency bands, fixed tuned bandpass filter means for translating any frequency in one of the frequency bands, and means for returning the numerical value of the translated frequency to within the range of $f_2$ to $[f_2+\delta]$ for application to the next succeeding channel as the given frequency, the given frequency being the second frequency in a first channel of the plurality of channels.

For a better understanding of the present invention, together with other and further objects thereof, reference is had to the following description, taken in connnection with the accompanying drawings, and its scope will be pointed out in the appended claims.

Referring to the drawings:

FIG. 4 is a table depicting the frequencies for a typical frequency translating channel.

Figure 1:
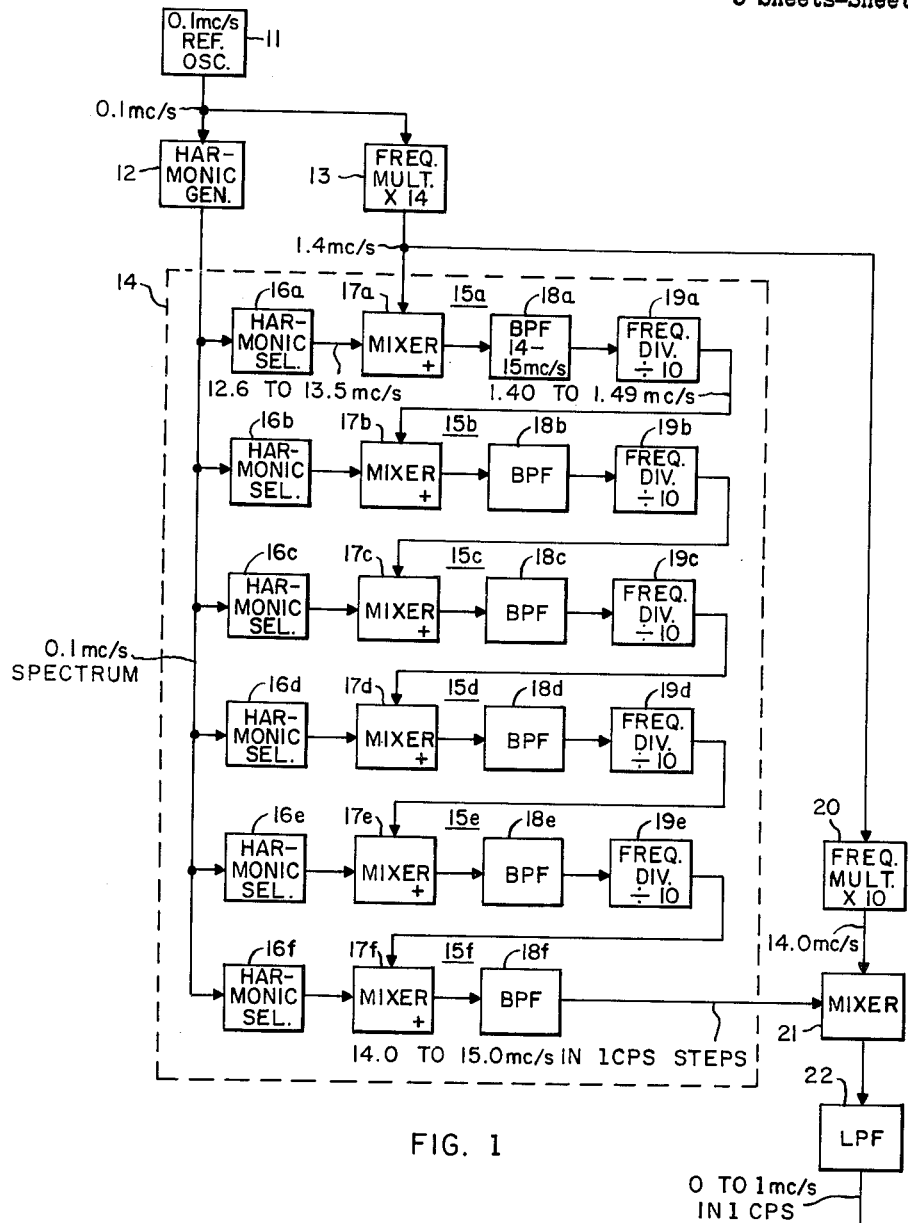
FIG. 1 is a frequency synthesizer embodying the present invention.

There is shown in FIG. 1 a basic frequency synthesizer embodying apparatus constructed in accordance with the present invention so as to be capable of generating a resultant frequency of precise value expressed in a number system of base N (in a decimal number system, $N=10$). As shown, the synthesizer of FIG. 1 is tunable from 0 c.p.s. to 1.0 mc./s. in 1 c.p.s. steps. Although only six digit selector (signal-translating channels $15a-15f$ are shown, in accordance with one advantage of the invention as will be seen clearly hereinafter, additional channels of identical construction may be added, thereby enabling the selection of digital values to any desired low order position limited only by the accuracy of the reference frequency. In other words, by adding another digit selector channel, the resultant frequency would be tunable from 0 c.p.s. to 1.0 mc./s. in 0.1 c.p.s. steps.

The synthesizer includes means for supplying at least one frequency of a set of individual frequencies having, according to one aspect of the invention, accurately controlled values in the range $f_1$ to $[f_1+(N-1)\delta]$, wherein $\delta$ is the frequency spacing between adjacent ones of the individual frequencies. Such means may include a 0.1 mc./s. reference oscillator 11, and harmonic generator 12. Harmonic generator 12 is of conventional construction (as are all the units of FIG. 1) and produces from the 0.1 mc./s. signal a spectrum of frequencies with a 0.1 mc./s. spacing ($\delta$) between adjacent harmonics of the spectrum. For the purpose of description, $f_1$ is chosen to be 12.6 mc./s. and thus the aforementioned set of frequencies is 12.6 mc./s. to 13.5 mc./s. or, in other words, the 126th and 135th harmonics in the generated spectrum.

The synthesizer further includes means such as frequency multiplier 13 for supplying a second frequency of accurately controlled value within the range $$f_2 \text{ to } (f_2+\delta)$$

where $$f_2 = \frac{f_1}{N-1}$$

Thus, in FIG. 1 where $f_1$ is 12.6 mc./s., $f_2$ is one-ninth that value or 1.4 mc./s. Frequency multiplier 13 therefore is arranged to multiply the output of reference oscillator 11 by a factor of 14 to produce the desired 1.4 mc./s. frequency.

The synthesizer further includes selector means 14, including a plurality of signal translating channels $15a-15f$ for selecting, in each channel, a digit to appear in the resultant frequency produced at the output of selector means 14. More specifically, the 1.4 mc./s. frequency from multiplier 13 is repetitively operated on in each of channels $15a-15f$ to successively insert a digital value in a high order digit position and to shift such inserted digital value to a lower order digit position. With this arrangement, the digital value that is ultimately to appear in the lowest order digit position is inserted during the first operation in channel $15a$ and, as the frequency is translated through the subsequent channels, is successively shifted to lower order positions until it reaches the lowest order position at the output of channel $15f$. Likewise, the digital value that is to appear in the second lowest digital order position is inserted during the second operation in channel $15b$ and successively shifted to lower order positions until it ultimately reaches the desired second lowest order position at the output of channel $15f$.

To this end, the individual channels, for example channel $15a$, includes first means for producing from the 1.4 mc./s. frequency and from one of the individual frequencies 12.6 mc./s. to 13.5 mc./s. combinations thereof lying within discrete frequency bands. Such means may include a harmonic selector $16a$ for choosing a desired one of the supplied individual frequencies, depending upon the digital value to be inserted in this channel, and a mixer $17a$, preferably of the balanced type, to produce, at the output of mixer $17a$, sums and differences of the supplied frequencies. As will become more clear presently, due to the relation between the supplied frequencies at the inputs of mixer $17a$, regardless of which one of the individual frequencies is selected by harmonic selector $16a$, the resulting sum and difference frequencies will always occur respectively within discrete frequency bands that do not overlap any of the frequency band corresponding to any of the other sum or difference frequencies.

Figure 2:
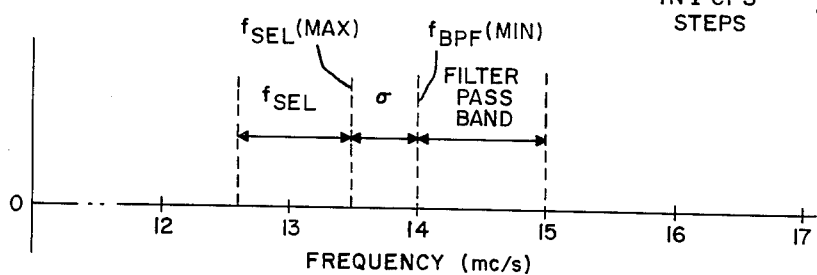
FIG. 2 is a frequency graph useful in explaining the invention.

Channel $15a$ also includes a bandpass filter $18a$ for translating any frequency lying within one of the aforementioned frequency bands, for example having a frequency characteristic adapted to pass any frequency occurring within the sum frequency band of 14.0 mc./s. to 15.0 mc./s. as shown in FIG. 2. Since there is no overlapping of the sum frequency band with the harmonic selector frequency band, the filter $18a$ may be of the fixed bandpass type, thereby eliminating the need for tunable filter sections such as found in conventional frequency synthesizers. Channel $15a$ then includes a frequency divider $19a$, arranged to divide by the number base N, which in this case is the factor ten, for returning the value of the frequency at the output of filter $18a$ to within the aforementioned range of $f_2$ to $[f_2+\delta]$ for application to the next succeeding signal-translating channel $15b$. The lowest order harmonic selector $16a$ is shown identical to the remaining harmonic selectors $16b-16f$ to facilitate the addition of still lower order harmonic selectors should the need arise. Should no finer frequency increments be needed, the lowest order harmonic selector $16a$ may be adjusted from 14.0 mc./s. to 14.9 mc./s. thereby eliminating units 13, $17a$, and $18a$.

Thus, if for example, the 128th harmonic (12.8 mc./s.) is selected in selector $16a$ and combined with the 1.4 mc./s. frequency from multiplier 13, there is produced at the output of mixer $17a$, sums and differences of multiples of the combining frequencies as, for example, the sum frequencies 14.2 mc./s., 15.6 mc./s., etc. and the difference frequencies 11.4 mc./s., 10.0 mc./s., etc. Only the 14.2 mc./s. frequency is passed through filter $18a$ and is then divided by ten to produce the frequency 1.42 mc./s. at the input to mixer $17b$. At this point it should be noted that the digital value "2" is inserted in a relatively high order digit position, namely the 0.1 mc./s. (i.e.: 100 kc./s.) digit position of the sum frequency 14.2 mc./s. and is then shifted, without any change in digital value, to the next lowest order digit position, namely the 10 kc./s. digit position. Eventually, this digital value will be shifted down to the 1 c.p.s. digit position in the resultant frequency. Thus, 1 c.p.s. increments are generated from a 100 kc./s. spectrum.

As mentioned above, channel 15b is of the same construction as channel 15a, except that the one input of mixer 17b is coupled to the output of channel 15a rather than multiplier 13. However, the 1.42 mc./s. frequency is still well within the aforementioned frequency band of $f_2$ to $[f_2+\delta]$, which, in the case of FIG. 1, is from 1.4 mc./s. to 1.5 mc./s. With the exception of channel 15f, all the remaining channels 15b–15e are of the same construction as channel 15a and, therefore, the description of their construction and operation need not be repeated. There is no frequency divider in channel 15f since the digit being selected in that channel is the one that appears in the 100 kc./s. digit position in the resultant frequency and, therefore, no further shifting is required. The foregoing pattern of identical operations in each successive channel presents one of the unique advantages of the present invention and, when coupled with the teaching of the use of a specific relation between the respective input frequencies so as to avoid spurious or undesired frequencies from occurring within filter pass bands, offers a novel frequency synthesizer having an accuracy and flexibility heretofore unattainable. The downward range of digit selection in the resultant frequency, i.e., the lowest order digit to be selected, may be increased or decreased simply by adding or subtracting identical digit-selector channels.

The output of digit-selector means 14 is limited to the range of 14 mc./s. to 15 mc./s. In order to produce a resultant frequency tunable from 0 c.p.s. to 1 mc./s. in 1 c.p.s. steps, conventional mixing and filtering techniques may be used, an example of which is illustrated in FIG. 1. Specifically, the 1.4 mc./s. frequency from multiplier 13 is further multiplied by a factor of ten in multiplier 20 to produce a fixed frequency of 14 mc./s. This is then mixed with the output of digit-selector means 14 in a mixer 21 and the difference frequency is translated through a low-pass filter 22. Similar techniques may be used to produce tunable frequencies in the range of 1 mc./s. to 10 mc./s., 10 mc./s. to 100 mc./s., etc. all without disturbing the accuracy of the digit in the 1 c.p.s. digit position.

While the foregoing description is believed to be adequate for an understanding of the invention, it may be helpful to consider the mathematical analysis of the operation of a series of digit-selector channels in order to more fully understand how the various relationships, previously set forth, were derived. For the purpose of this analysis, the following definitions apply.

$N$ = the number base; that is $N = 1, 2, 3, 4, \ldots$ $f_1$ = the lowest frequency available from harmonic frequency selectors which are in this example 16a–16f $f_2$ = the initial offset frequency; for example, the frequency from multiplier 13

$\delta$ = the frequency spacing of the harmonic frequency selector spectrum; for example, the frequency spacing between adjacent selected frequencies at the outputs of selectors 16a–16f $a, b, c, \ldots m, n$ = the digit values of the frequencies selected in the individual channels 15a etc.

$k$ = the number of digits in the resultant frequency and corresponds to the number of modulators; for example, 17a–17f.

Considering channel 15a of FIG. 1, the frequency selected at selector 16a may be represented by the expression $f_1 + a\delta$, where $a$ may have any of the digit values 0, 1, 2, 3, $\ldots N-2, N-1$; and similarly in channel 15b the selected frequency is $f_1 + b\delta$, where $b$ similarly may be one of the digits 0, 1, 2, 3, $\ldots N-2, N-1$. As previously mentioned, it is not necessary that there be a frequency divider in the final digit-selector channel 15f and, thus, the first selected digit $a$ will be divided by the factor $N^{k-1}$ (i.e., one less time than there are selector channels), while the second selected digit $b$ will be divided by the factor $N^{k-2}$, etc. With this in mind, it may be shown that the expression for the frequency $f_{out}$ at the output of selector means is:

$$f_{out} = \frac{f_2 + f_1 + a\delta}{N^{k-1}} + \frac{f_1 + b\delta}{N^{k-2}} + \frac{f_1 + c\delta}{N^{k-3}} + \cdots + \frac{f_1 + n\delta}{N^0} \quad (1)$$

Regrouping the right-hand side of Equation 1 in terms of $f_1$, $f_2$, and $\delta$, Equation 1 becomes $$f_{out} = \frac{f_2}{N^{k-1}} + f_1\left[\frac{1}{N^0} + \frac{1}{N^1} + \cdots + \frac{1}{N^{k-2}} + \frac{1}{N^{k-1}}\right] + \delta\left[\frac{n}{N^0} + \frac{m}{N^1} + \cdots + \frac{b}{N^{k-2}} + \frac{a}{N^{k-1}}\right] \quad (2)$$

From this equation the rules for repeatability may be determined; that is to say, in order to enable the use of identical circuits in each successive digit-selector channel; for example, in our case channels 15a–15f, there is a relationship between the frequencies $f_1$ and $f_2$ which must be adhered to and which may be determined from Equation 2. Thus, in accordance with one aspect of the invention, all the digit-selector channels are functionally connected in series and for each channel to be identical to the others, with all the digits $a$ through $n$ set to zero, the output of each frequency divider then must be at the same frequency. Thus, assuming digits $a$ through $n$ are equal to zero, the last term of Equation 2 disappears and there remains:

$$f_{out} = \frac{f_2}{N^{k-1}} + f_1\left[\frac{1}{N^0} + \frac{1}{N^1} + \cdots + \frac{1}{N^{k-2}} + \frac{1}{N^{k-1}}\right] \quad (3)$$

Obviously, the output frequency in Equation 3 is a function of $k$, or in other words, a function of the number of digit-selector channels used. Since this is contrary to the desired condition, it is necessary that Equation 3 be rewritten in a form independent of the factor $k$. Applicant has determined that this can be done by choosing the aforementioned specific relationship between frequencies $f_1$ and $f_2$ such that Equation 3 may then become an infinite series of the converging type. This relationship is as follows:

$$\frac{f_2}{N^{k-1}} = f_1\left[\frac{1}{N^k} + \cdots + \frac{1}{N^\infty}\right] \quad (4)$$

That this does, in fact, give a converging infinite series may be seen by substituting Equation 4 into Equation 3 to produce the equation:

$$f_{out} = f_1\left[\frac{1}{N^0} + \frac{1}{N^1} + \cdots + \frac{1}{N^{k-2}} + \frac{1}{N^{k-1}} + \frac{1}{N^k} + \frac{1}{N^{k+1}} + \cdots + \frac{1}{N^\infty}\right] \quad (5)$$

Solving Equation 4 produces the relationship:

$$f_2 = f_1\left[\frac{1}{N} + \frac{1}{N^2} + \frac{1}{N^3} + \cdots + \frac{1}{N^\infty}\right] \quad (6)$$

The right-hand side of Equation 6 is also an infinite series which can be rewritten in the form $1/N-1$ and thus the relationship between $f_1$ and $f_2$ for repeatability of circuits is:

$$\frac{f_2}{f_1} = \frac{1}{N-1} \quad (7)$$

A further criterion for proper operation of frequency synthesizer apparatus constructed in accordance with the invention relates to the selection of proper frequencies such that fixed tuned bandpass filters, for example, filters 18a–18f, may be used without having undesired sums and differences of multiples of the combining frequencies of the mixers, for example mixers 17a–17f, appear in the pass bands of the filters. In other words, only the single selected frequency should occur within the pass bands of the fixed tuned filters. Since all of the bandpass filters, for example, filters 18a–18f, are effectively connected in cascade, it becomes extremely difficult to insure that higher order mixer products, of the general form $\alpha f_1 \pm \beta f_2$, of the sum and difference frequencies produced at any point along the chain of selector channels does not occur within the pass bands of subsequent bandpass filters. This problem can be eliminated, however, by insuring that the mixing ratio for each mixer in the apparatus is approximately ten.

A particular spurious problem, of the general class described above, which is inherent in prior systems of the type presently being described is set forth below. The accompanying mathematical analysis illustrates clearly that even this problem is eliminated in frequency synthesizer apparatus constructed in accordance with the present invention. Considering digit selector channel 15f, the output of filter 18f is represented by Equation 2. The highest possible frequency, $f_{SEL\ (max.)}$, at the output of selector 16f is the one for which the digit $f = (N-1)$. Thus, the highest selectable frequency at selector 16f and, for that matter any of the other selectors 16a–16e, may be represented by:

$$f_{SEL\ (max.)} = f_1 + (N-1)\delta \quad (8)$$

The lowest frequency $f_{BPF\ (min.)}$ required to be passed by filter 18f is the frequency for which all the digits are equal to zero, and is the same as that represented by Equation 3. Thus:

$$f_{BPF(min.)} = \frac{f_2}{N^{k-1}} + f_1\left[\frac{1}{N^0} + \frac{1}{N^1} + \frac{1}{N^2} + \cdots + \frac{1}{N^{k-3}} + \frac{1}{N^{k-2}} + \frac{1}{N^{k-1}}\right] \quad (9)$$

Since $f_{SEL\ (max.)}$ represents one of the possible signals to be supplied to mixer 17f, it is necessary that it does not fall in the pass band of filter 18f in order to eliminate the possibility that it will occur as an undesired or spurious output from selector channel 15f. FIG. 2 shows graphically the relationship between $f_{SEL\ (max.)}$ and the pass band of filter 18f for the specific case where mixer 17f is a sum frequency mixer. The frequency spacing between $f_{SEL\ (max.)}$ and $f_{BPF\ (min.)}$ corresponding to the lower end of the pass band must necessarily be greater than zero to insure that any harmonic frequency selector spurious remains outside the pass band and is designated by the symbol $\sigma$ (as in FIG. 2), which may be represented by the equation:

$$\sigma = f_{BPF(min.)} - f_{SEL(max.)} = \frac{f_2}{N^{k-1}} + f_1\left[\frac{1}{N^0} + \frac{1}{N^1} + \frac{1}{N^2} + \cdots + \frac{1}{N^{k-2}} + \frac{1}{N^{k-1}}\right] - [f_1 + (N-1)]\delta \quad (10)$$

Let $$\sigma = \rho\delta > 0 \quad (11)$$

where $\rho$ is a constant, and let $$\frac{\delta}{f_1} = g(N) \quad (12)$$

where $g(N)$ is some function of the number base N. Then, dividing Equation 12 by Equation 7, the following equation results:

$$\frac{\delta}{f_2} = [g(N)][N-1] \quad (13)$$

Substituting Equations 13, 12, and 11 into Equation 10 produces the result:

$$[g(N)][\rho + N - 1] = \left[\frac{1}{N^1} + \frac{1}{N^2} + \cdots + \frac{1}{N^{k-2}} + \frac{1}{N^{k-1}}\left(1 + \frac{1}{N-1}\right)\right] \quad (14)$$

It can be shown that the terms within the brackets on the right-hand side of Equation 14 can be simplified to produce the result:

$$g(N)(\rho + N) = \left[\frac{1}{N-1}\right] \quad (15)$$

From Equation 10 and FIG. 2 it can be seen that for $f_{SEL\ (max.)}$ to remain outside of the pass band of filter 18f, $\rho$ must always have a positive value greater than zero. Substituting Equation 12 into Equation 15 and solving for $f_1$, it can be seen that in addition to $\rho$ being positive, $f_1$ must be related to frequency spacing $\delta$ and the number base N by the following equation:

$$f_1 = \delta(N-1)[\rho + (N-1)] \quad (16)$$

Having selected the value of $f_1$, the value of $f_2$ may be determined from Equation 7.

Figure 3:
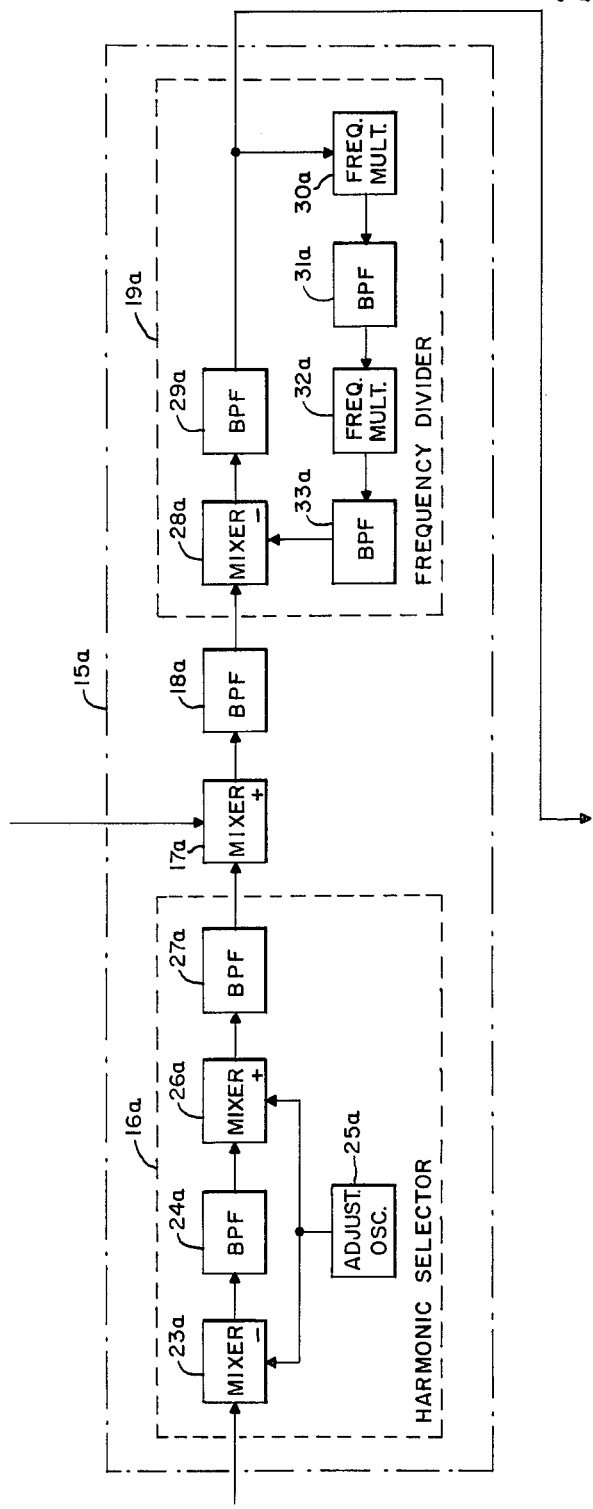
FIG. 3 is a detailed block diagram of a typical frequency translating channel employed in the frequency synthesizer of FIG. 1.

Referring now to FIG. 3 of the drawings, there is shown in detail one of the digit selector (signal-translating) channels, for example channel 15a. There has been set forth previously a description of the over-all construction of the signal-translating channels 15a through 15f, together with equations governing their individual and collective operation. There will now be shown a typical arrangement of components which may be used to implement a signal-translating channel together with specific operating frequencies for those components which will not only present good mixing ratios for the various mixers used, but also eliminate any possible spurious output signals from the channel due to feed-through, lack of image rejection, etc.

As stated previously, there is included in signal-translating channel 15a, a harmonic selector 16a, which in itself may include a first mixer 23a, a first bandpass filter (BPF) 24a, an adjustable oscillator 25a, a second mixer 26a, and a second BPF 27a. The aforementioned units are interconnected substantially as shown in FIG. 3, with the input to first mixer 23a and the output from second BPF 27a being respectively the input and output of harmonic selector 16a, in which the aforementioned units are included. Also included in signal-translating channel 15a, and having an input connected to the output of harmonic selector 16a is a third mixer 17a. An additional input to third mixer 17a is connected from the output of frequency multiplier 13. There is connected to the output of third mixer 17a a third BPF 18a, whose output is in turn connected to the input of frequency divider 19a. The frequency divider 19a may in itself include a fourth mixer 28a, a fourth BPF 29a, a first frequency multiplier 30a, a fifth BPF 31a, a second frequency multiplier 32a, and a sixth BPF 33a. The aforementioned units, which in the present example comprise frequency divider 19a, are interconnected substantially as shown in FIG. 3, with the input to fourth mixer 28a from BPF 18a and the output from fourth BPF 29a being respectively the input and output of frequency divider 19a.

As set forth above, the aforementioned units acting in cooperation constitute a preferred embodiment of a signal-translating channel, for example channel 15a, constructed according to the present invention. The remaining signal-translating channels 15b through 15f may be identical in construction to that one just described except for the final signal-translating channel 15f which does not include a frequency divider in its output.

Examples of the particular operating frequencies to be found at various points within signal-translating channel 15a are presented in the table of FIG. 4 of the drawings, which table is believed to be self-explanatory. The particular frequencies shown in the table have been chosen in accordance with the equations set forth previously and represent an optimization of circuit operation and performance.

There are three additional criteria which must be satisfied in selecting the operating frequencies of the various units in a signal-translating channel.

(1) The output frequencies of adjustable oscillator 25a, and the center frequency of first BPF 24a must be chosen to provide desirable mixing ratios for first mixer 23a, and to ensure that the mixer images lie between adjacent harmonics of the input spectrum from harmonic generator 12. This will provide this portion of the signal-translating channel with excellent image rejection characteristics. For example, in the present case the image frequencies for first mixer 23a are 9.850 mc./s., 9.950 mc./s., . . . 10.650 mc./s. and 10.750 mc./s. It can be seen that each of these image frequencies falls midway between adjacent harmonics of the 0.1 mc./s. input spectrum, and therefore will be rejected with excellent results.

(2) The center frequency of first BPF 24a must also be chosen to lie between adjacent harmonics of the input spectrum to ensure rejection of all harmonics which may possibly leak through first mixer 23a thus arriving at the input of first BPF 24a. In the present example the center frequency of first BPF 24a is selected to be 1.375 ms./s., thus lying between the harmonic frequencies 1.300 mc./s. and 1.400 mc./s. Due to the narrow pass band characteristics of first BPF 24a, it will reject both of the aformentioned harmonics.

(3) The pass band of second BPF 27a must be chosen such that the highest output frequency of the adjustable oscillator 25a does not fall into the low end of this pass band. This is accomplished in the present example by selecting the highest output frequency of adjustable oscillator 25a to be 12.125 mc./s., while the lowest frequency passed by second BPF 27a is 12.600 mc./s.

It will be appreciated that each of the above criteria may be met while retaining fixed tuned filters throughout a signal-translating channel. Other prior systems of this type have employed variable tuned filters whose accuracy in setting is inherently poor in comparison to that of a fixed tuned filter.

Thus, it has been shown that the present invention incorporates simplicity, accuracy, interchangability, and reliability in producing a frequency synthesizer capable of operation to such standards as are unobtainable by prior systems of this type.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a frequency synthesizer, apparatus for generating a resultant frequency of precise value expressed in a number system of base N with digital values accurately selected to any desired low order position, comprising:

means for supplying a set of individual frequencies having accurately controlled values in the range $f_1$ to $[f_1+(N-1)\cdot\delta]$, where $\delta$ is the frequency spacing between adjacent ones of said individual frequencies, and where $f_1=\delta(N-1)[\rho+(N-1)]$, with $\rho$ being any positive constant greater than zero;

means for supplying a second frequency of accurately controlled value within the range $f_2$ to $[f_2+\delta]$, where $$f_2=\frac{f_1}{N-1}$$

and means including a plurality of signal-translating channels for selecting in each channel a digit to appear in said resultant frequency, each channel comprising means for producing from a given frequency and one of said individual frequencies, combination frequencies thereof lying within discrete frequency bands, fixed tuned bandpass filter means for translating any frequency in one of said frequency bands, and means for returning the numercial value of said translated frequency to within said range of $f_2$ to $[f_2+\delta]$ for application to the next succeeding channel as said given frequency, said given frequency being said second frequency in a first channel of said plurality of channels.

2. Apparatus constructed in accordance with claim 1 wherein said means for producing combination frequencies produces a plurality of sum and difference frequencies.

3. Apparatus constructed in accordance with claim 1 wherein said means for producing combination frequencies produces a plurality of sum frequencies each lying within one of a set of discrete frequency bands, and wherein said fixed tuned bandpass filter means translates said sum frequency lying within one of said frequency bands.

4. In a frequency synthesizer, apparatus for generating a resultant frequency of precise value expressed in a number system of base N with digital values accurately selected to any desired low order position, comprising:

means for supplying a set of individual frequencies having accurately controlled values in the range $f_1$ to $[f_1+(N-1)\cdot\delta]$, where $\delta$ is the frequency spacing between adjacent ones of said individual frequencies, and where $f_1=\delta(N-1)[\rho+N-1)]$, with $\rho$ being any positive constant greater than zero;

means for supplying a second frequency $f_2$ of accurately controlled value within the range $f_2$ to $(f_2+\delta)$, where $$f_2=\frac{f_1}{N-1}$$

and means including a plurality of signal-translating channels for repetitively operating on said second frequency to insert in a high order digit position a digital value to appear in said resultant frequency which on each repetitive operation is shifted to the next lower order digit position, each channel comprising means for producing from a given frequency and one of said individual frequencies, combination frequencies thereof, lying within discrete frequency bands, fixed tuned bandpass filter means for translating any frequency in one of said frequency bands, and means for returning the numerical value of said translated frequency to within said range of $f_2$ to $[f_2+\delta]$ for application to the next succeeding channel as said given frequency, said given frequency being said second frequency in a first channel of said plurality of channels.

5. In a frequency synthesizer, apparatus for generating a resultant frequency of precise value expressed in a number system of base N with digital values accurately selected to any desired low order position, comprising:

means for supplying a set of individual frequencies having accurately controlled values in the range $f_1$ to $[f_1+(N-1)\cdot\delta]$ where $\delta$ is the frequency spacing between adjacent ones of said individual frequencies, and where $f_1=\delta(N-1)[\rho+(N-1)]$, with $\rho$ being any positive constant greater than zero;

means for supplying a second frequency $f_2$ of accurately controlled value within the range $f_2$ to $(f_2+\delta)$, where $$f_2=\frac{f_1}{N-1}$$

and means including a plurality of signal-translating channels for repetitively operating on said second frequency to insert in the same high order digit position in each channel an individual digital value corresponding to a digital value to appear in said resultant frequency and which, on repetitive operation, is shifted without any change in digital value to the next lower order digit position, each channel comprising means for producing from a given frequency and one of said individual frequencies, a plurality of sum and difference frequencies respectively lying within discrete frequency bands, fixed tuned bandpass filter means for translating any frequency in one of said frequency bands, and means for returning the numerical value of said translated frequency to within said range of $f_2$ to $[f_2+\delta]$ for for application to the next succeeding channel as said given frequency being said second frequency in a first channel of said plurality of channels.

6. In a frequency synthesizer, apparatus for generating a resultant frequency of precise value expressed in a number system of base N with digital values accurately selected to any desired low order position, comprising:

means for generating from an accurately controlled reference frequency a plurality of harmonic frequencies with equal frequency spacings $\delta$ and for supplying from said harmonic frequencies a set of individual harmonic frequencies in the range $f_1$ to $[f_1+(N-1)\cdot\delta]$, where $\delta$ is the frequency spacing between adjacent ones of said individual frequencies and where $f_1=\delta(N-1)[\rho+(N-1)]$, with $\rho$ being any positive constant greater than zero;

means for generating from said reference frequency a second frequency of value within the range $f_2$ to $(f_2+\delta)$, where $$f_2=\frac{f_1}{N-1}$$

and means including a plurality of signal-translating channels for selecting in each channel a digit to appear in said resultant frequency, each channel comprising means for producing from a given frequency and one of said individual harmonic frequencies combination frequencies thereof lying within discrete frequency bands, fixed tuned bandpass filter means for translating any frequency in one of said frequency bands, and means for returning the numerical value of said translated frequency to within said range of $f_2$ to $[f_2+\delta]$ for application to the next succeeding channel as said given frequency, said given frequency being said second frequency in a first channel of said plurality of channels.

7. Apparatus constructed in accordance with claim 6 wherein said means for producing combination frequencies produces a plurality of sum and difference frequencies.

8. In a frequency synthesizer, apparatus for generating a resultant frequency of precise value expressed in a number system of base N with digital values accurately selected to any desired low order position, comprising:

means for generating from an accurately controlled reference frequency a plurality of harmonic frequencies with equal frequency spacings $\delta$ and for supplying from said harmonic frequencies a set of individual harmonic frequencies in the range $f_1$ to $[f_1+(N-1)\cdot\delta]$, where $\delta$ is the frequency spacing between adjacent ones of said individual frequencies and where $f_1=\delta(N-1)[\rho+(N-1)]$, with $\rho$ being any positive constant greater than zero;

means for generating from said reference frequency a second frequency of value within the range $f_2$ to $(f_2+\delta)$, where $$f_2=\frac{f_2}{N-1}$$

and means including a plurality of signal-translating channels for repetitively operating on said second frequency to insert in a high order digit position a digital value to appear in said resultant frequency which, on each repetitive operation, is shifted to the next lower order digit position, each channel comprising means for producing from a given frequency and one of said individual frequencies, combination frequencies thereof, lying within discrete frequency bands, fixed tuned bandpass filter means for translating any frequency in one of said frequency bands, and means for returning the numercial value of said translated frequency to within said range of $f_2$ to $[f_2+\delta]$ for application to the next succeeding channel as said given frequency, said given frequency being said second frequency in a first channel of said plurality of channels.

References Cited by the Examiner

UNITED STATES PATENTS

| 2,617,039 | 11/1952 | Young | 331—42 |
| 2,829,255 | 4/1958 | Bolie | 331—42 |
| 2,934,716 | 4/1960 | Smith | 331—43 |

FOREIGN PATENTS

| 148,412 | 9/1952 | Australia. |

ROY LAKE, *Primary Examiner.*

JOHN KOMINSKI, *Examiner.*